United States Patent
Schrader

(10) Patent No.: US 6,587,871 B1
(45) Date of Patent: Jul. 1, 2003

(54) SYSTEM, METHOD, AND APPARATUS FOR CONVERTING VOICE MAIL TO TEXT AND TRANSMITTING AS AN EMAIL OR FACSIMILE

(75) Inventor: Charles R. Schrader, Flower Mound, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/218,858

(22) Filed: Dec. 22, 1998

(51) Int. Cl.[7] .................. G06F 15/16; H04M 11/00
(52) U.S. Cl. ............... 709/206; 709/207; 379/88.02; 379/93.02; 379/100.08
(58) Field of Search ................ 379/88.13, 88, 379/88.02, 100.08, 93.02; 704/235, 270, 275; 709/206, 207; 707/530, 531; 370/110.1; 455/410, 411

(56) References Cited

U.S. PATENT DOCUMENTS

| | | | | |
|---|---|---|---|---|
| 5,633,916 A | * | 5/1997 | Goldhagen et al. | 379/67 |
| 5,675,507 A | * | 10/1997 | Bobo, II | 709/206 |
| 5,687,220 A | * | 11/1997 | Finnigan | 379/67 |
| 5,712,901 A | * | 1/1998 | Meermans | 379/88 |
| 5,737,395 A | * | 4/1998 | Irribarren | 379/88.13 |
| 5,740,231 A | * | 4/1998 | Cohn et al. | 370/401 |
| 5,742,668 A | * | 4/1998 | Pepe et al. | 379/58 |
| 5,742,905 A | * | 4/1998 | Pepe et al. | 455/461 |
| 5,875,448 A | * | 2/1999 | Boys et al. | 707/531 |
| 5,884,262 A | * | 3/1999 | Wise et al. | 704/270 |
| 5,926,525 A | * | 7/1999 | Kim | 379/88.23 |
| 5,943,398 A | * | 8/1999 | Klein et al. | 379/88.13 |
| 5,946,386 A | * | 8/1999 | Rogers et al. | 379/265 |
| 5,991,365 A | * | 11/1999 | Pizano et al. | 379/88.13 |
| 5,995,936 A | * | 11/1999 | Brais et al. | 704/275 |
| 6,052,442 A | * | 4/2000 | Cooper et al. | 379/88.19 |
| 6,151,572 A | * | 11/2000 | Cheng et al. | 704/235 |
| 6,154,757 A | * | 11/2000 | Krause et al. | 707/530 |
| 6,169,789 B1 | * | 1/2001 | Rao et al. | 379/110.1 |
| 6,215,858 B1 | * | 4/2001 | Bartholomew et al. | 379/88.17 |

\* cited by examiner

Primary Examiner—Frantz B. Jean
(74) Attorney, Agent, or Firm—Jenkens & Gilchrist, P.C.

(57) ABSTRACT

A system and method for receiving voice mail messages as a text-based email message or a facsimile transmission are presented. When a voice mail message is received from a calling party, the voice mail message is recorded into mass memory. Later, when the called party seeks to retrieve the called party's voice mail messages, the message can be converted to text and sent as either an email message to a designated email address or a facsimile transmission to a designated facsimile number. Additionally, a subscriber is able to record a message and have the recorded message converted to text and sent to a designated email address or facsimile number.

24 Claims, 4 Drawing Sheets

SYSTEM, METHOD, AND APPARATUS FOR CONVERTING VOICE MAIL TO TEXT AND TRANSMITTING AS AN EMAIL OR FACSIMILE

BACKGROUND OF THE INVENTION

1. Technical Field of the Invention

The present invention relates generally to communicating messages in a telecommunications network, and more particularly, to communicating prerecorded messages.

2. Description of Related Art

In addition to offering telephonic services, most telecommunications networks offer a communication service known as voice mail. Voice mail is a service whereby any party can leave a recorded voice message for the subscriber which is stored at a voice mail center. The voice mail center is usually connected as an Intelligent Peripheral (IP) to the telecommunications network and accessible by establishing a phone call to a specific directory phone number associated with the voice mail center. A party can leave a voice message for a subscriber by calling the specific directory phone number, or more commonly, be forwarded to the voice mail center when calling the subscriber's phone number. The subscriber retrieves the message by establishing a call to the voice mail center using the directory phone number.

Since the introduction of voice mail, voice mail can be found in virtually all business telephone systems, as well as many residential telephone systems. Voice mail allows parties to leave messages from a suitably connected telephone, from anywhere in the world, which can also be accessed by any suitably connected telephone.

Individuals who are traveling or otherwise inaccessible by telephone for an extended period of time receive numerous important, and often lengthy voice mail messages. When reviewing numerous and highly detailed messages, the recipient must often take handwritten notes to remember the details of each particular voice mail message. Generally, the speed of oral communications exceeds the speeds of the recipient's handwriting, therefore, the recipient must either write shorthand, or repeatedly listen to the same voice mail message.

One possible solution is the use of electronic mail (email) messages. Electronic mail is a system whereby two or more computers connected across a communications medium electronically transmit messages in the form of data. Common communications media include a Local Area Network (LAN) connection, or an Ethernet connection. However, the most popular communications medium is known as the Internet. The Internet is a network which joins together computer networks from educational institutions, the government, the military, and many private businesses in all parts of the world. Because the Internet is a worldwide network, a party in any part of the world can establish a connection to the Internet via a computer and send an email message to any other party on the Internet. The use of the Internet as a communications medium allows parties to leave messages from a suitably connected computer, from anywhere in the world, which can also be accessed by any suitably connected computer. Additionally, because the messages are text based, problems associated with handwriting notes are obviated.

Despite the foregoing advantages of email messages, a number of drawbacks exist. In order for a party to send an email message, the party must at a minimum have access to a computer terminal that is suitably connected. Although computers and data terminals are commonplace in most business environments, a significant number of residential homes do not have a computer. Additionally, many users may find typing and transmitting an email message to be more cumbersome and less intuitive compared to simply making a phone call and leaving an oral message. Accordingly, it would be advantageous if the accessibility of voice mail could be utilized by a party to leave a message for a recipient, while the textual qualities of email could be used by the recipient to receive the message.

Accordingly, it is an object of the present invention to send messages from a sending party to a recipient using a telephone terminal and a voice mail center.

It is also an object of the present invention to forward the message in the form of a textual data communication.

SUMMARY OF THE INVENTION

The present invention is directed to a system and method for delivering a message for a called telephone terminal, including a peripheral for receiving and recording a voice message for the called telephone terminal from a calling telephone terminal, a voice/text conversion module which converts the voice message to a text message, and a computer connected to the peripheral for transmitting the text message from the peripheral to a designated email address.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
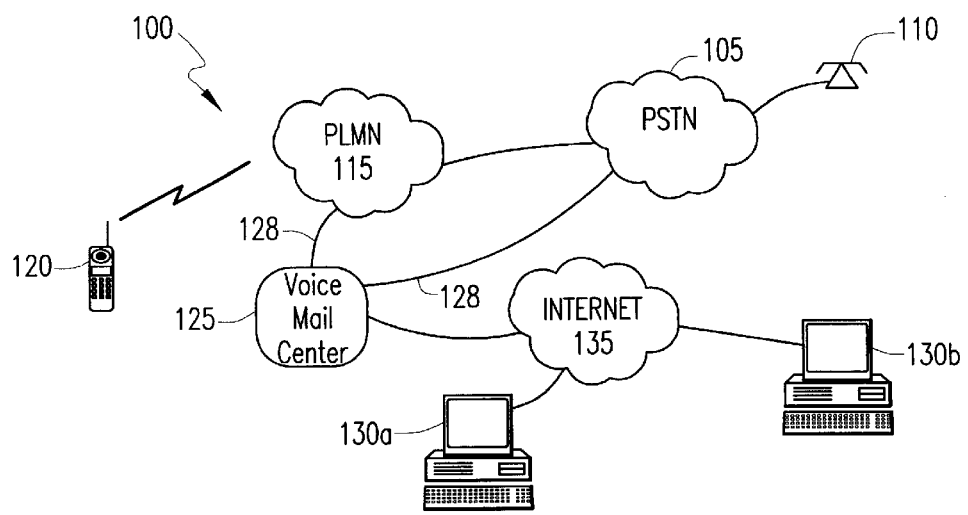
FIG. 1 is a block diagram of a telecommunications network configured in accordance with the present invention.

Referring now to FIG. 1, there is illustrated a telecommunications network 100 configured in accordance with the present invention. The telecommunications network can include telephone networks such as a Public Switched Telephone Network 105 for providing wireline telephone service to wireline telephone terminals 110, as well as a Public Land Mobile Network 115 providing wireless telephone service to mobile stations 120. In addition to offering telephonic services, the telecommunications network 100 offers a communication service known as voice mail. Voice mail is a service whereby any party at a telephone terminal, such as wireline telephone terminal 110 or mobile station 120, can leave a recorded voice message for the subscriber which is stored at a voice mail center 125. The voice mail center 125 is commonly connected via a phone line 128 as an Intelligent Peripheral (IP) to the telecommunications network 100 and accessible by establishing a phone call to a specific directory phone number associated with the voice mail center 125. A party can leave a voice message for a subscriber by calling the specific directory phone number, or more commonly, be forwarded to the voice mail center 125 when calling the subscriber's phone number. The subscriber retrieves the message by establishing a call to the voice mail center 125 using the directory phone number, with a telephone terminal, e.g., wireline telephone terminal 110 or mobile station 120.

Individuals who are traveling or otherwise inaccessible by telephone for an extended period of time receive numerous important, and often lengthy voice mail messages. When reviewing numerous and highly detailed messages, the recipient must often take handwritten notes to remember the details of each particular voice mail message. Generally, the speed of oral communications exceeds the speed at handwritten communication, therefore, the recipient must either handwrite the notes extremely rapidly, or repeatedly listen to the same voice mail message.

To alleviate the foregoing problem, the present invention proposes converting the recorded voice messages received at the voice mail center 125 into a textual message, which can be delivered to the recipient as an electronic mail (email) message. Electronic mail is a system whereby two or more computers, e.g., computer system 130a and computer system 130b, connected across a communications medium 135 electronically transmit messages in the form of data. Common communications media 135 include a Local Area Network (LAN) connection, or an Ethernet connection. However, the most popular communications medium is known as the Internet 135. The Internet 135 is a network which joins together computer networks from educational institutions, the government, the military, and many private businesses in all parts of the world. Because the Internet 135 is a worldwide network, a party in any part of the world can establish a connection to the Internet 135 via a computer, e.g., computer system 130a and send an email message to any other party with a computer system 130b also connected to the Internet 135.

The voice mail center 125 is connected to the Internet 135 and is thereby able to transmit an email message to any computer system 130 also connected to the Internet 135. The voice mail messages that are stored at the voice mail center 125 are in the form of data digitizing the audio signals representing the voice message of the party leaving the message. Although the data digitizing the audio signals can be transmitted in as an email message, it is noted that there are situations where it is advantageous for the recipient to receive the messages in the form of a text based email message. Accordingly, the voice mail center 125 converts the digitized audio signals into written text, and the written text is then sent as an email message accessible by the recipient.

Figure 2:
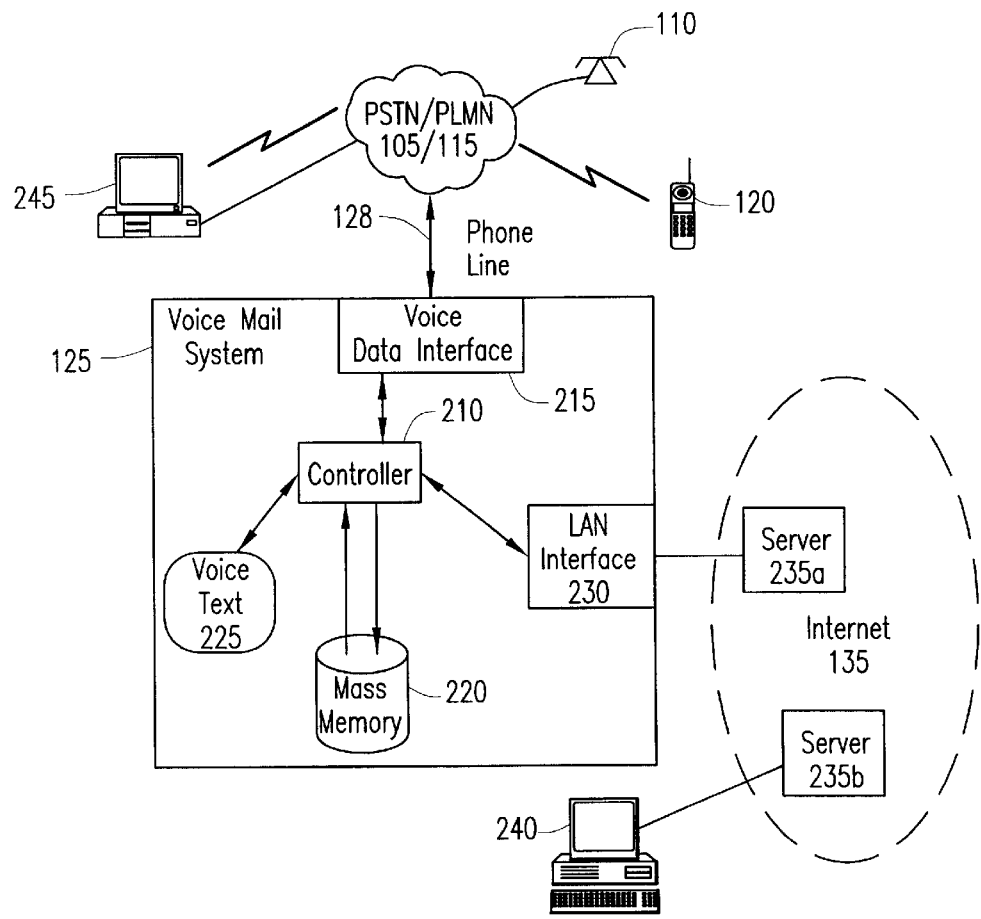
FIG. 2 is a block diagram of an exemplary voice mail center embodying the present invention.

Referring now to FIG. 2, there is illustrated a block diagram of the voice mail center 125 embodying the present invention. The voice mail center 125 includes a controller 210, a voice/data connection interface 215, mass memory 220, a voice/text conversion module 225, and a Local Area Network Interface 230. The voice mail center 125 is connected to a PSTN 105 and/or a PLMN 115 via phone line 128 connectable to the voice/data interface 215. The voice mail center 125 receives both voice signals as well as data signals which are effectuated from a keypad (not shown) on a telephone terminal, such as wireline telephone terminal 110 or mobile station 120, and received in the form of dual-tone multi-frequency (DTMF) signals. The voice signals represent messages which are intended to be recorded for later review by the recipient and are stored in the mass memory 220. The mass memory 220 can store any number of messages for any number of subscribing recipients.

A subscriber at, e.g., mobile station 120 can direct all incoming phone calls to be forwarded to the voice mail center 125. After forwarding the phone call to the voice mail center 125, the controller 210 prompts the calling party to leave a voice message which is received over phone line 128 and recorded in mass memory 220.

The recipient can review messages recorded for the recipient in the mass memory 220 by merely effectuating a phone call to the voice mail center 125 using any telephone terminal, 110, 120. After establishing a phone call to the voice mail center 125, the recipient is prompted by the controller 210 to identify themselves, and permitted to review the messages stored for the recipient in the mass memory 220. The recipient is able to respond to prompts and communicate commands to the voice mail center 125 using DTMF signals. It is noted that the recipient can communicate commands in a number of other ways besides DTMF signals. For example, in an alternate embodiment, the user can use audible voice commands that are understandable by the voice mail center 125.

While reviewing messages stored in the mass memory 220, a recipient may wish to receive the message as a text-based email message. By issuing the proper command to the voice mail center 125 using DTMF signals, the controller 210 can selectively direct the message to be converted to a text file by the voice/text conversion module 225, and direct the text file to be transmitted as an email message to either a default email address or an email address communicated to the voice mail center 125 by the recipient during the phone call.

Responsive to a request to transmit a particular voice mail message as a text-based email message, the controller 210 routes the voice message stored in the mass memory 220 to the voice/text conversion module 225 which creates a text file and stores the text file in the mass memory 220. The controller 210 then retrieves the text file and incorporates the text file into an email message bearing a predetermined email address. The email message is forwarded to a server 235a on the Internet 135 via a LAN interface 230. The server 235a then routes the email message to a server 235b on the Internet associated with the predetermined email address in a manner well known in the art. The message can then be reviewed from a computer or data terminal 240 suitably connected to the server 235b.

Alternatively, while reviewing voice messages stored in the mass memory 220, the recipient may wish to receive the voice message as a text-based facsimile at a facsimile terminal 245. By issuing the proper command to the voice mail center 125 using DTMF signals, the controller 210 can selectively direct the message to be converted to a text file by the voice/text conversion module 225, and the text file to be transmitted as a facsimile message to either a default facsimile number or a facsimile number communicated to the voice mail center 125 by the recipient during the phone call.

Responsive to a request to transmit a particular voice mail message as a text-based facsimile, the controller 210 routes the voice message stored in the mass memory 220 to the voice/text conversion module 225 which creates a text file and stores the text file in the mass memory 220. The controller 210 then retrieves the text file and incorporates the text file into a facsimile message directed to a facsimile terminal 245 associated with a particular facsimile number. At the completion of the phone call, the voice mail center 125 effectuates a phone call to the facsimile terminal 245 associated with the predetermined facsimile number via phone line 128 and transmits the facsimile message to the facsimile terminal in a manner well known in the art.

Figure 3:
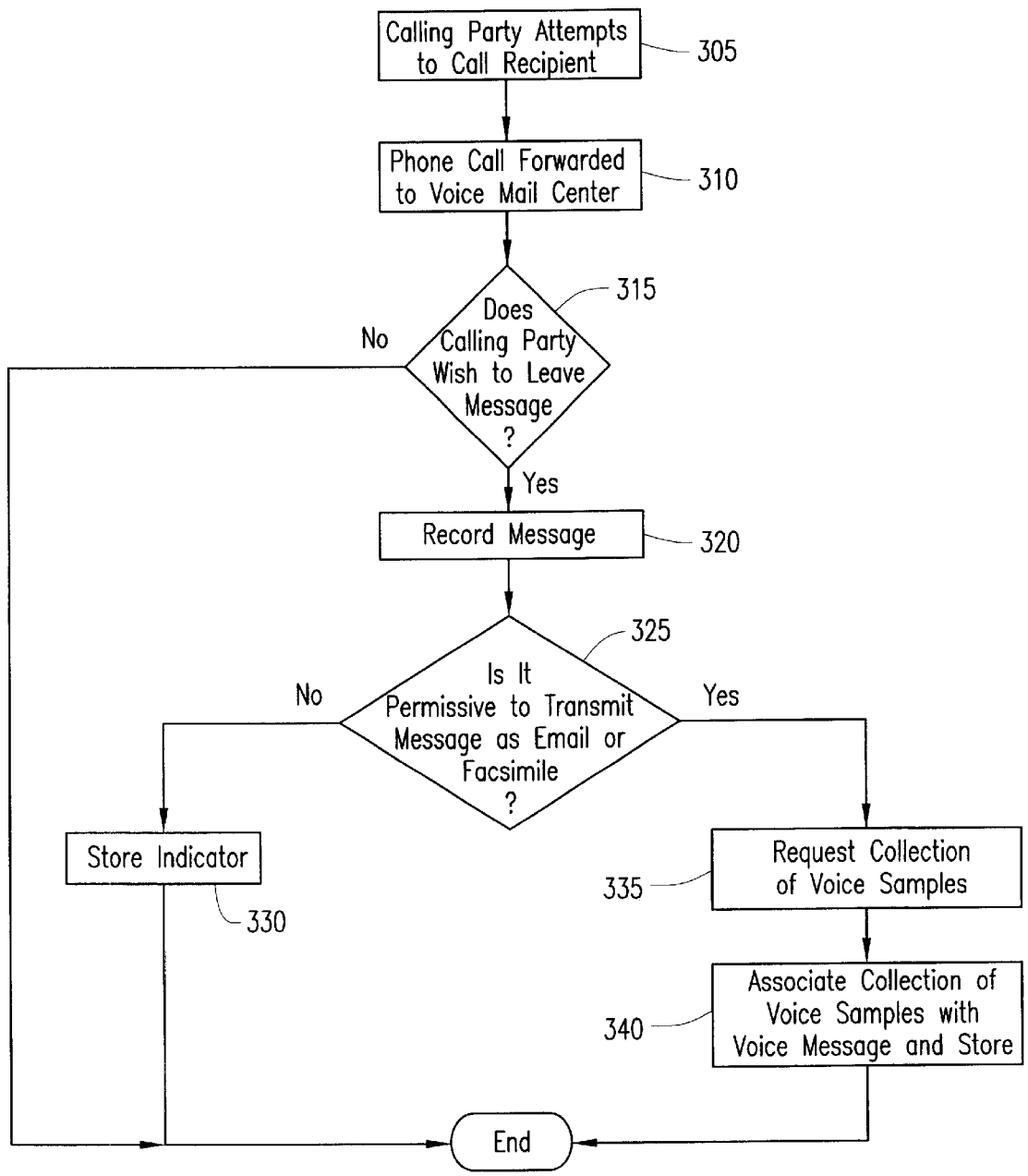
FIG. 3 is a flow chart illustrating the operation of the voice mail center recording a voice message.

Referring now to FIG. 3, there is illustrated a flow diagram illustrating the operation of the voice mail center 125 storing a message from a calling party associated with, e.g., telephone terminal 110 for a recipient at, e.g., mobile station 120. At step 305, the calling party 110 attempts to call the recipient 120. The phone call is forwarded to voice mail center 125 pursuant to prior directions from the recipient 120 (step 310). At step 315, the voice mail center 125 informs the calling party 110 that the recipient is not available to answer the phone call and asks the calling party 110 to leave a voice mail message (step 315). If the calling party 110 chooses to leave message, the message is recorded and stored in the mass memory 220 (step 320), otherwise the process is terminated. It is recognized that the use of the Internet 135 or facsimile terminal 245 raises a number of security and privacy concerns. Although sophisticated encryption exists, a calling party 110 may not wish for the message to be transmitted over the Internet 135 or to a facsimile terminal 245. Therefore, at the completion of the message, the calling party 110 is asked if it is permissible to transmit the message to an email address or facsimile terminal, should the recipient so choose (step 325). If the calling party 110 indicates that the voice mail message should not be transmitted to an email address or a facsimile terminal 245, an indicator is associated with the message and also stored in the mass memory 220 (step 330) and the process is terminated.

On the other hand, if the calling party 110 indicates that the message can be transmitted to an email address or a facsimile machine 245, the voice message can be converted to text and transmitted to an email address or facsimile terminal 245, if and when the recipient so requests. It is noted that in order to convert a calling party's voice message to a text-based message, it is necessary for the calling party 110 to initially provide a collection voice samples of known text read aloud by the calling party 110. The collection of voice samples can later be used by the voice/text conversion module 225 to convert the voice message to a text-based message. Accordingly, the calling party 110 is requested to provide a collection of voice samples during step 335, which are associated with the voice message and stored in the mass memory 220 (step 340), thereby completing the process.

The collection of voice samples from the calling party 110 can be provided in a number of ways. For example, in one embodiment, the calling party 110 provides the voice samples by reading aloud particular words at the prompt of the voice mail center during step 335. In another embodiment, frequently calling parties 110 may at a prior time, establish a collection of voice samples stored in mass memory 220. During step 335, the calling party 110 merely identifies themselves or provides an identification number associated with their collection of voice samples.

Figure 4:
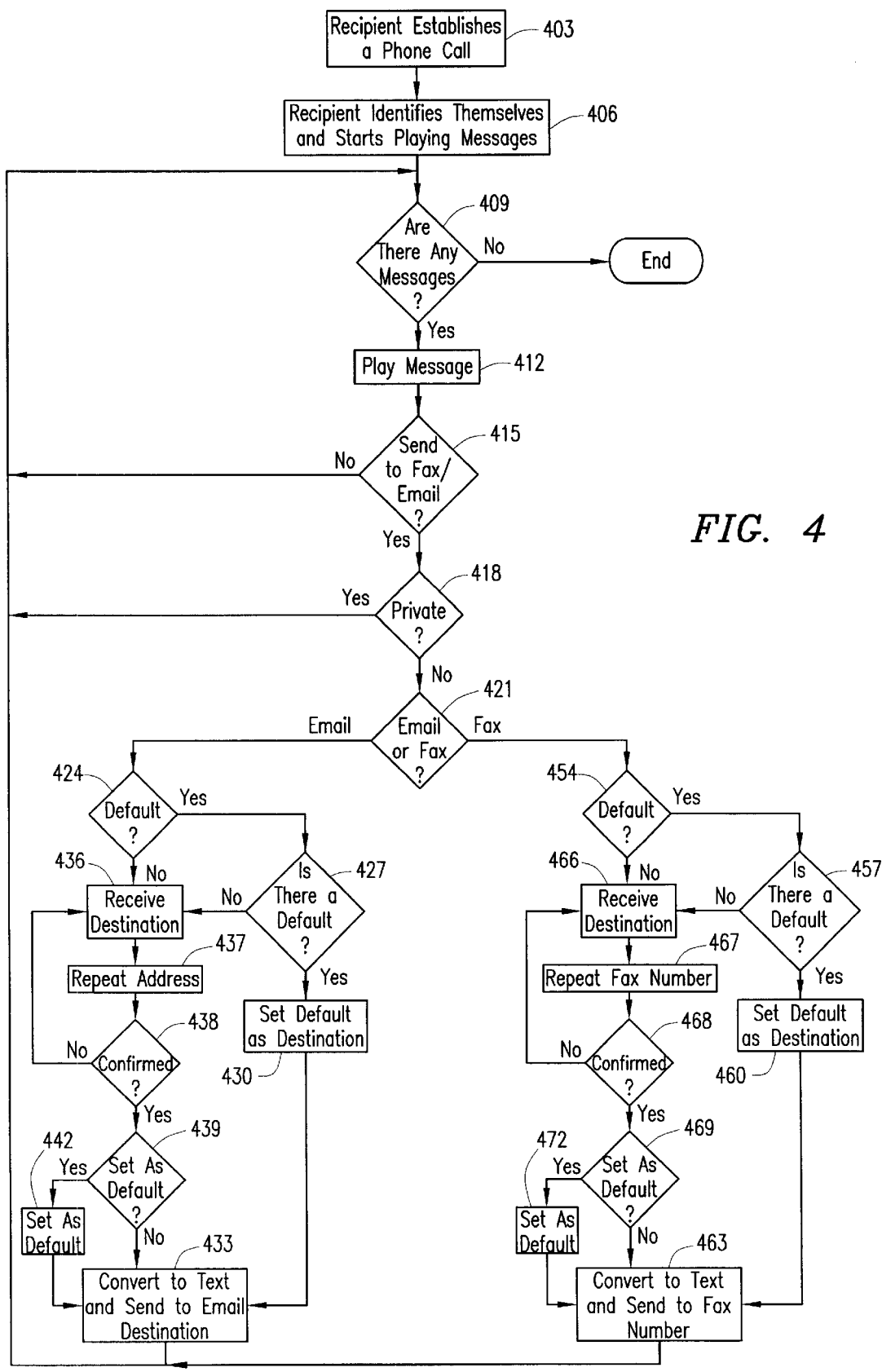
FIG. 4 is a flow chart illustrating the operation of the voice mail center forwarding a voice message to an email address or a facsimile terminal.

Referring now to FIG. 4, there is illustrated a flow diagram illustrating the operation of the voice mail center 125 transmitting a voice mail message stored in mass memory 220, responsive to the commands issued by a recipient at mobile station 120. At step 403, the recipient establishes a phone call from the mobile station 120 to the voice mail center 125. After establishing the phone call, the voice mail center 125 prompts the recipient 120 to identify themselves and commence reviewing any messages (step 406). During step 409, the controller determines if there are any messages in the mass memory 220 that have not been reviewed by the recipient 120. If there are no voice messages that have not been reviewed by the recipient 120, the process is terminated.

On the other hand, if there are voice messages that have not been reviewed by the recipient 120, a message is played for the recipient 120 during step 412. At any time during the playing of the voice message and for a short period thereafter, the recipient 120 can direct that the message be forwarded to an email address or a facsimile terminal 245 (step 415). If during step 415, the recipient has requested that the voice message be forwarded to an email address or facsimile terminal 245, the voice mail center 125 checks to see if the calling party has permitted the message to be forwarded when the message was recorded, i.e., during step 325 (step 418).

If the recipient has requested that the message be forwarded to an email address or facsimile terminal 245, and the calling party has indicated that the voice message may be forwarded, the voice mail center 125 asks the recipient if the message should be sent to a facsimile terminal 245 or an email address (step 421).

If the recipient 120 has indicated that the voice message should be transmitted to an email address during step 421, the voice mail center 125 asks the recipient if the message should be sent to a default email address (step 424). Where the recipient chooses to send the message to a default email address, the voice mail center 125 checks to see if the recipient has a default email address (step 427), and where so, sets the default email address as the destination (step 430), converts the voice mail message to a text message, and sends the text message as an email message to the destination email address (step 433). If during step 424, the recipient 120 indicates that the message should not be sent to a default email address, or during step 427, the voice mail center 125 determines that there is no default address, a destination email address is requested from the recipient. At step 436, the recipient communicates an email address using a keypad associated with mobile station 120 to identify an email address. Those skilled in the art will recognize that the destination email address can be communicated to the voice mail center 125 from mobile station 120 in a character by character fashion, using the double digit codes of TABLE 1. Alternatively, the user can audibly spell the characters comprising the email address. During step 437, the characters comprising the received destination email address are audibly transmitted to the user, and the user is asked to confirm the received destination email address (step 438). If the user determines that the received destination email address was improperly transmitted, the user can decline to confirm during step 438, causing steps 436–438 to be repeated. After the user confirms at step 438, the recipient is asked whether the destination email address received during step 436 should be set as the default address (step 439). If the recipient indicates that the destination address should be used as the default address, the destination address is set as the default address (step 442), otherwise this step is bypassed. During step 433, the voice mail message is converted to text and the text is sent to the destination email address.

TABLE 1

| A = 21 | B = 22 | C = 2 | D = 31 | E = 32 | F = 33 |
|---|---|---|---|---|---|
| G = 41 | H = 42 | I = 43 | J = 51 | K = 52 | L = 53 |
| M = 61 | N = 62 | O = 63 | P = 71 | Q = 11 | R = 72 |
| S = 73 | T = 81 | U = 82 | V = 83 | W = 91 | X = 92 |
| Y = 93 | Z = 12 | . = 01 | _ = 02 | @ = 03 | 0 = #0 |
| 1 = #1 | 2 = #2 | 3 = #3 | 4 = #4 | 5 = #5 | 6 = #6 |
| 7 = #7 | 8 = #8 | 9 = #9 | 0 = #0 | | |

If the recipient 120 has indicated that the voice message should be transmitted to a facsimile terminal 245 during step 421, the voice mail center 125 asks the recipient if the message should be sent to a default facsimile terminal 245 (step 454). Where the recipient chooses to send the message to a default facsimile number, the voice mail center 125 checks to see if the recipient has a default facsimile number (step 457), and where so, sets the default as the destination facsimile number (step 460), converts the voice mail message to a text message, and sends the text message as a facsimile message to the destination facsimile number (step 463). If during step 454, the recipient 120 indicates that the message should not be sent to a default facsimile number, or during step 457, the voice mail center 125 determines that there is no default facsimile number, a destination facsimile number is requested from the recipient (step 466). Alternatively, the user can audibly dictate the numbers comprising the facsimile number. During step 467, the digits comprising the received destination facsimile number are audibly transmitted to the user, and the user is asked to confirm the received destination facsimile number (step 438). If the user determines that the received destination facsimile number was improperly transmitted, the user can decline to confirm during step 438, causing steps 436–438 to be repeated. After the user confirms at step 438, the recipient is asked whether the destination facsimile number received during step 466 should be set as the default facsimile number (step 469). If the recipient indicates that the destination facsimile number should be used as the default facsimile number, the destination facsimile number is set as the default facsimile number (step 472), otherwise this step is bypassed. During step 463, the voice mail message is converted to text and the text is sent to the destination facsimile number.

After the voice message is converted to text and sent to an email address or a facsimile terminal 245, steps 409–463 are repeated for each remaining voice message stored in the mass memory 220. If during step 415, the recipient has not requested that the message should be sent to an email address or facsimile terminal 245, or during step 418, the voice mail center 125 determines that the voice message should not be forwarded, steps 421–463 are bypassed for the present voice message, and steps 409–463 are repeated for each remaining voice message stored in the mass memory 220.

In addition to permitting a subscriber to the voice mail center to receive messages as text-based email or facsimile transmissions, the present invention also permits a subscriber to record a voice message, convert the voice message into a text-based message, and transmit the text-based message to another party's email address or facsimile terminal 245.

Figure 5:
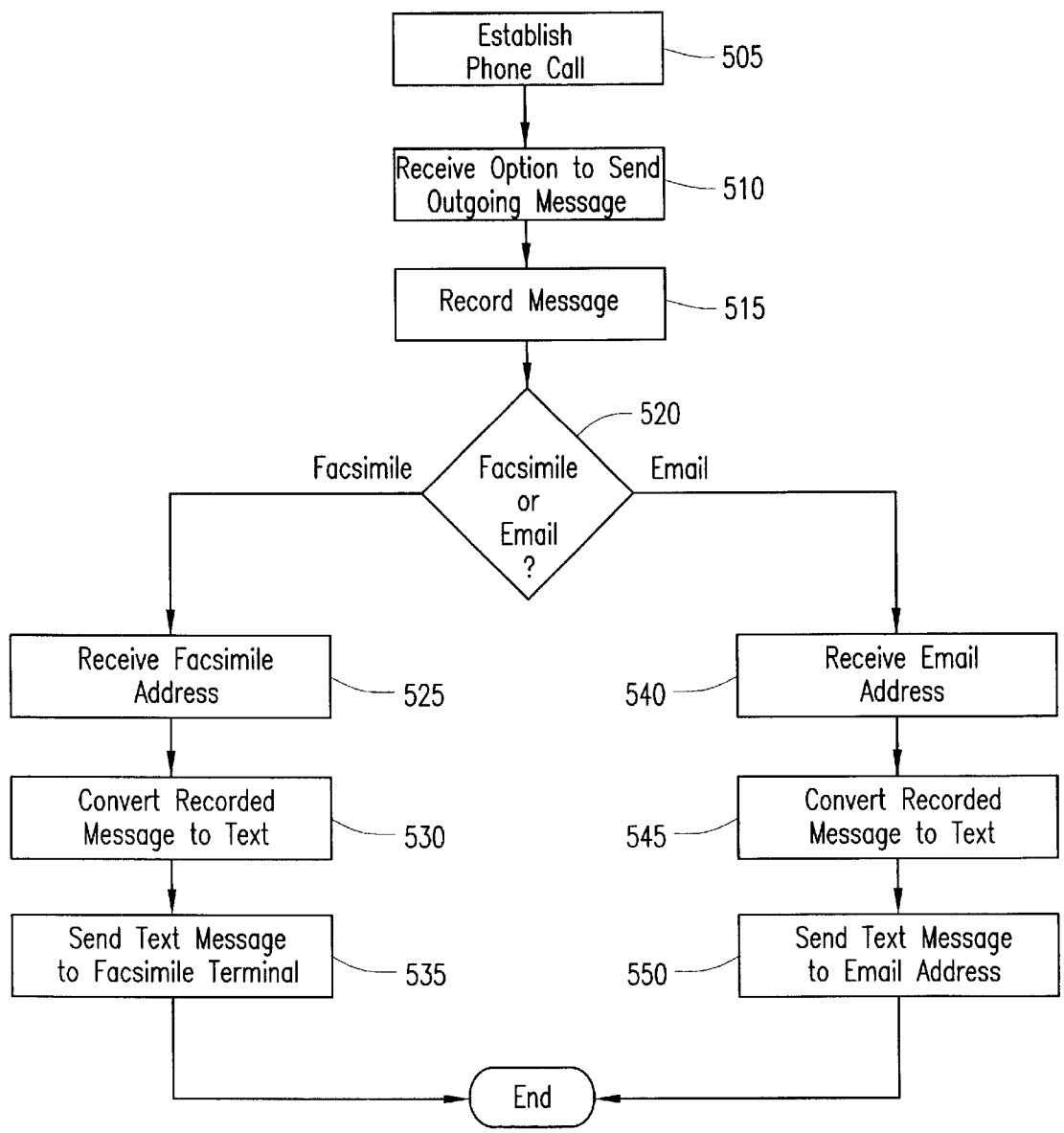
FIG. 5 is a flow chart illustrating the operation of the voice mail center forwarding a voice message from a subscriber to an email address or a facsimile terminal.

Referring now to FIG. 5, there is illustrated a flow diagram illustrating the operation of the voice mail center 125 receiving a voice message from a subscriber, and transmitting a text-based conversion of the voice message to another party's email or facsimile terminal 245. At step 505, the subscriber at, e.g., mobile station 120, establishes a phone call to the voice mail center 125. After establishing a phone call to the voice mail center 125, the subscriber issues a command to the voice mail center 125 via the keypad on the mobile station 120 to record a message for transmission to an email address or facsimile terminal 245 (step 510). At step 515, the voice mail center 125 records the subscriber's message, and then asks whether the subscriber would like to send the message to a facsimile terminal 245 or an email address (step 520).

If the subscriber indicates that the message should be transmitted to a facsimile terminal 245, the voice mail center 125 prompts the subscriber for the facsimile number (step 525), and converts the voice message to a text-based message (step 530). The conversion of the voice message to a text-based message is performed by the voice/text conversion module 225 using a collection of voice samples provided by the subscriber. It is recognized that the voice samples can be provided in a number of different ways. For example, during the initial setup of the voice mail center 125 services for the subscriber, the subscriber can orally read predetermined text. The subscriber's oral readings can then be recorded and used whenever the subscriber's voice messages are recorded. After converting the voice message to a text message, the text message is sent to the facsimile terminal identified during step 525 (step 535).

If during step 520, the subscriber indicates that the message should be sent to an email address, the voice mail center prompts and receives from the subscriber a destination email address (step 540). The subscriber can communicate the email address using the codes set forth in TABLE 1. The voice message is then converted to text (step 545) and sent to the email address designated during step 540 (step 550).

Although the invention has been described with a certain degree of particularity, it should be recognized that elements thereof may be altered by persons skilled in the art without departing from the spirit and scope of the invention. Therefore, the invention is limited only by the following claims and their equivalents.

What is claimed is:

1. A system for delivering a message for a called telephone terminal, said system comprising:

a peripheral for receiving a voice message for said called telephone terminal from a calling telephone terminal over a telecommunications network, said peripheral recording said voice message;

means for prompting a calling party associated with said calling telephone terminal for permission to transmit said received voice message to a predetermined computer;

means for performing a review of the content of said voice message;

means for selectively converting said voice message to a text message via an electronic voice/text conversion module if said calling party does provide permission to transmit said voice message to said predetermined computer and based on said review of said voice message and responsive to user input; and a computer connected, to said peripheral for transmitting said text message from said peripheral to said predetermined computer.

2. The system of claim 1, wherein said peripheral is operable to transmit said recorded voice message to a recipient telephone terminal.

3. The system of claim 2, wherein said peripheral is operable to receive a plurality of commands from said recipient telephone terminal, and responsive to receiving a particular one of said plurality of commands, causing said computer to transmit said text message to said predetermined computer.

4. The system of claim 1, wherein said peripheral is operable to receive a plurality of commands from said calling telephone terminal, and responsive to a particular one of said plurality of commands, causing said computer to transmit said recorded message to said predetermined computer.

5. The system of claim 1, wherein said computer is connected to a network of communication channels, said network of communication channels connected to said predetermined computer.

6. The system of claim 5, wherein said network of communication channels comprises the Internet.

7. The system of claim 1, wherein said system further comprises:
   means for establishing a phone call with a predetermined facsimile terminal; and
   means for transmitting said text message to said predetermined facsimile terminal.

8. The system of claim 7, wherein said peripheral is operable to receive a plurality of commands from a recipient telephone terminal, and responsive to receiving a particular one of said plurality of commands, causing said said text message to be transmitted to said predetermined facsimile terminal.

9. The system of claim 7, wherein said peripheral is operable to receive a plurality of commands from said calling telephone terminal, and responsive to a particular one of said plurality of commands, causing said text message to be transmitted to said predetermined facsimile terminal.

10. A method for delivering a message for a called telephone terminal, said method comprising:
    receiving a voice message at a peripheral for said called telephone terminal from a calling telephone terminal over a telecommunications network;
    recording said voice message in a mass memory;
    prompting a calling party associated with said calling telephone terminal for permission to transmit said received voice message to a predetermined facsimile machine;
    reviewing the content of said voice message;
    after reviewing the content of said voice message and in response to said calling party providing permission to transmit said received voice message to said predetermined facsimile machine, selectively converting said voice message to a text message via an electronic voice/text conversion module and responsive to user input; and
    transmitting said text message from said peripheral to said predetermined facsimile machine.

11. The method of claim 10, further comprising the step of:
    transmitting said recorded voice message to a recipient telephone terminal.

12. The method of claim 11, further comprising the steps of:
    receiving a particular command from said recipient telephone terminal; and
    wherein said step of transmitting said text message to said predetermined facsimile terminal is responsive to said step of receiving said particular command from said recipient telephone terminal.

13. The method of claim 10, further comprising the step of:
    receiving a particular command from said calling telephone terminal; and
    wherein said step of transmitting said recorded message to said predetermined facsimile terminal is responsive to said step of receiving said particular command from said calling telephone terminal.

14. The method of claim 10, wherein said step of transmitting said message to said predetermined facsimile terminal further comprises the step of:
    establishing a phone call with said predetermined facsimile terminal.

15. A method for delivering a message for a called telephone terminal, said system comprising:
    receiving a voice message at a peripheral for said called telephone terminal from a calling telephone terminal over a telecommunications network;
    recording said voice message in a mass memory;
    prompting a calling party associated with said calling telephone terminal for permission to transmit said received voice message to a predetermined computer;
    reviewing the content of said voice message;
    after reviewing the content of said voice message and in response to said calling party providing permission to transmit said received voice message to said predetermined computer, selectively converting said voice message to a text message via an electronic voice/text conversion module and responsive to user input; and
    transmitting said text message from said peripheral to said predetermined computer.

16. The method of claim 15, further comprising the step of:
    transmitting said recorded message to a recipient telephone terminal.

17. The method of claim 16, further comprising the steps of:
    receiving a command from said recipient telephone terminal; and
    wherein said step of transmitting said text message to said predetermined computer is responsive to said step of receiving said command from said recipient telephone terminal.

18. The method of claim 15, further comprising the step of:
    receiving a command from said calling telephone terminal; and
    wherein said step of transmitting said recorded message to said predetermined computer is responsive to said step of receiving said command from said calling telephone terminal.

19. The method of claim 15, further comprising the step of:
    receiving an indicator identifying said predetermined computer from a recipient telephone terminal.

20. The method of claim 19, wherein said indicator is an electronic mail address.

21. A method for delivering a message for a called telephone terminal, said method comprising:
    receiving a voice message at a peripheral for said called telephone terminal from a calling telephone terminal over a telecommunications network;

recording said voice message in a mass memory;

prompting a calling party associated with said calling telephone terminal for permission to transmit said received voice message to a facsimile machine;

if said calling party does not provide permission to transmit said voice message to said facsimile machine, enabling an indicator associated with said voice message stored in said memory; and if said calling party does provide permission to transmit said voice message to said facsimile machine:
converting said voice message to a text message via an electronic voice/text conversion module and responsive to user input; and
transmitting said text message from said peripheral to said facsimile machine.

22. A method for delivering a message for a called telephone terminal, said method comprising:

receiving a voice message at a peripheral for said called telephone terminal from a calling telephone terminal over a telecommunications network;

recording said voice message in a mass memory;

prompting a calling party associated with said calling telephone terminal for permission to transmit said received voice message to a computer terminal;

if said calling party does not provide permission to transmit said voice message to said computer terminal, enabling an indicator associated with said voice message stored in said memory; and if said calling party does provide permission to transmit said voice message to said computer terminal:
converting said voice message to a text message via an electronic voice/text conversion module and responsive to user input; and
transmitting said text message from said peripheral to said computer terminal.

23. A system for delivering a message for a called telephone terminal, said system comprising:

a peripheral for receiving a voice message for said called telephone terminal from a calling telephone terminal over a telecommunications network;

means for recording said voice message in a mass memory;

means for prompting a calling party associated with said calling telephone terminal for permission to transmit said received voice message to a facsimile machine;

means for enabling an indicator associated with said voice message stored in said memory, if said calling party does not provide permission to transmit said voice message to said facsimile machine;

means for converting said voice message to a text message via an electronic voice/text conversion module, if said calling party does provide permission to transmit said voice message to said facsimile machine and responsive to user input; and means for transmitting said text message from said peripheral to said facsimile machine.

24. A system for delivering a message for a called telephone terminal, said system comprising:

a peripheral for receiving a voice message for said called telephone terminal from a calling telephone terminal over a telecommunications network;

means for recording said voice message in a mass memory;

means for prompting a calling party associated with said calling telephone terminal for permission to transmit said received voice message to a computer terminal;

means for enabling an indicator associated with said voice message stored in said memory, if said calling party does not provide permission to transmit said voice message to said computer terminal;

means for converting said voice message to a text message via an electronic voice/text conversion module, if said calling party does provide permission to transmit said voice message to said computer terminal and responsive to user input; and means for transmitting said text message from said peripheral to said computer terminal.

* * * * *